United States Patent [19]

Sakaguchi et al.

[11] Patent Number: 4,847,826

[45] Date of Patent: Jul. 11, 1989

[54] DISK CARTRIDGE

[75] Inventors: Kiyonori Sakaguchi; Makio Takaiwa, both of Tochigi; Akira Suzuki, Kanagawa, all of Japan

[73] Assignee: Sony Corporation, Tokyo, Japan

[21] Appl. No.: 149,520

[22] Filed: Jan. 28, 1988

[30] Foreign Application Priority Data

Feb. 2, 1987 [JP] Japan .............................. 62-12875[U]

[51] Int. Cl.$^4$ ........................ G11B 17/03; G11B 23/00
[52] U.S. Cl. .................................... 369/270; 360/133; 369/291
[58] Field of Search ............... 369/270, 271, 282, 289, 369/290, 291, 292; 360/133

[56] References Cited

U.S. PATENT DOCUMENTS 4,590,532 5/1986 Saito ..................................... 360/133
4,695,910 9/1987 Maruyama et al. .................. 360/133

FOREIGN PATENT DOCUMENTS

0186195 2/1986 European Pat. Off. .
0192188 8/1986 European Pat. Off. .
0230963 8/1987 European Pat. Off. .
649404A5 5/1985 Switzerland .

Primary Examiner—Steven L. Stephan
Attorney, Agent, or Firm—Philip M. Shaw, Jr.

[57] ABSTRACT

A disk cartridge includes a clamper of synthetic material rotatably mounted to a disk cartridge half and a magnetic plate secured to the clamper, is disclosed. According to the invention, a plurality of projections are formed in the magnetic plate. The clamper is integrally formed with a recess for accommodating the magnetic plate and a plurality of hooks formed along the peripheral wall of the recess. These projections are respectively engaged with the hooks to secure the magnetic plate to the clamper without using a securing system, such as ultrasonic welding.

8 Claims, 8 Drawing Sheets

DISK CARTRIDGE

BACKGROUND OF THE INVENTION

1. Field of the Invention

This invention relates to a cartridge containing a disk, that is, a disk-shaped recording medium, on which predetermined information signals are recorded. More particularly, it relates to such a disk cartridge in which clamp means, including a magnetic plate adapted to be clamped by magnetic attraction to a disk table of the disk drive for rotating the disk, is provided in a disk cartridge half.

2. Description of the Prior Art

A known disk cartridge is so arranged as to keep therein a disk-shaped recording medium such as a so-called compact disk on the like in such a fashion that the disk-like recording medium can be reproduced in that state. This type of the disk cartridge is mounted in a recording and/or reproducing apparatus with the disk accommodated therein so that the information signals are written or recorded on and read from the disk. One half of the cartridge is provided with an opening through which the signal recording surface of the disk is exposed to the outside of the disk cartridge to be contacted by a recording and/or reproducing pickup device and opening through which a drive unit disk table is inserted to rotate the disk. The disk cartridge half is provided with a clamp unit in a facing relation to the opening into which the disk table is inserted, wherein the clamp unit operates to clamp the disk to the disk table in cooperation with the disk table. The clamp unit is adapted to clamp the disk under the force of magnetic attraction of a magnet provided in the disk table, and includes a clamper of synthetic material rotatably mounted to the inner lateral side of the disk cartridge half, and a magnetic plate secured to the clamper.

Figure 1:
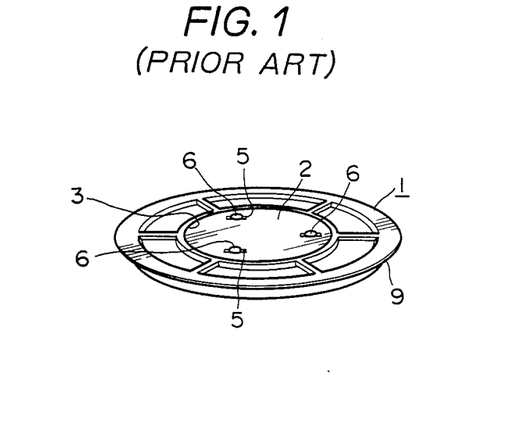
FIG. 1 is a perspective view showing a magnetic plate and a clamper constituting the clamp unit of a conventional disk cartridge.
Figure 2:
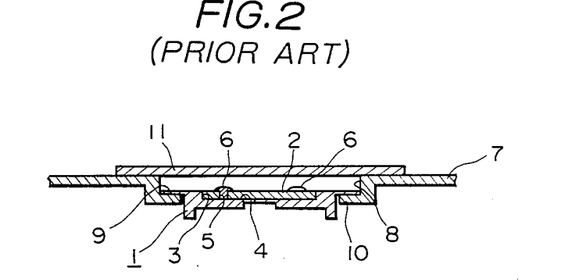
FIG. 2 is a vertical sectional view showing the clamp unit of the disk cartridge shown in FIG. 1.

Such a known clamp unit is shown for example in FIGS. 1 and 2.

The clamp unit shown in FIGS. 1 and 2 includes a clamper 1 formed of synthetic material and a magnetic plate 2, such as an iron plate, attached to one major surface of the clamper 1. The clamper is substantially in a disk form and has a recess 3 at the center of one major surface thereof for accommodating the magnetic plate 2. On the bottom wall section 4 of the recess 3, there are formed three projections 6 adapted for engaging in three through-holes 5 formed in the magnetic plate 2. The magnetic plate is integrally mounted to the clamper 1 with the projections 6 engaged in the through-holes 5 and with the projections fused by the application of ultrasonic waves. The clamper 1 having the magnetic plate 2 attached thereto is rotatably mounted to a half 7 of the disk cartridge, as shown in FIG. 2. This half 7 is provided with a clamper attachment opening 8 into which the clamper 1 is introduced. The peripheral edge of the attachment opening 8 towards the inner side of the disk cartridge is formed with a retaining lug 10 directing towards the inside of the clamper attachment opening 8 for retaining a ring-like flange 9 projecting from the outer periphery of the clamper 1. The clamper is introduced into the attachment opening 8 with the flange 9 retained by the lug 10. The clamper 1 is prevented from the extricating from the attachment opening 8 by a cover plate 11 attached to the outer lateral surface of the half 7 for closing the attachment opening 8. The clamper is attached to the half 7 so as to be rotated freely within the gap between the cover plate 11 and the lug 10.

In the above described clamper system, an ultrasonic welding process is required, in which the projections 6 are fused for securing the magnetic plate 2 to the clamper 1 formed of synthetic material. Thus a mechanical system such as the ultrasonic welder is required with a complicated assembly process step. In addition, considerable investment costs are required for the mechanical system resulting in increased production costs.

OBJECTS AND SUMMARY OF THE INVENTION

Accordingly, it is a principal object of the present invention to provide an improved disk cartridge.

It is another object of the present invention to provide a disk cartridge in which a clamping system is provided for clamping the disk to the disk table by the force of magnetic attraction.

It is a further object of the present invention to provide a disk cartridge in which the magnetic plate can be easily attached to a clamper of synthetic material.

It is a further object of the present invention to provide a disk cartridge according to which the magnetic plate can be attached to a clamper of synthetic material without employing an ultrasonic welding process.

It is a further object of the present invention to provide a disk cartridge of reduced thickness.

According to one aspect of the present invention, there is provided a disk cartridge comprising a clamper of synthetic material rotatably mounted in a disk cartridge half and a magnetic plate secured to the clamper, wherein a plurality of projections are formed in the magnetic plate, said clamper being integrally formed with a recess for accommodating said magnetic plate and a plurality of hook means formed along the peripheral wall of the recess, said projections in said magnetic plate being respectively engaged with said hook means to secure to said magnetic plate to said clamper.

These and other objects, features and advantages of the present invention will become apparent from the following detailed description of the preferred embodiments that are to be read in conjunction with the accompanying drawings, throughout which like reference numerals identify like elements and parts.

DESCRIPTION OF THE PREFERRED EMBODIMENTS

The present invention will now be described in detail with reference to the attached drawings.

A first embodiment of the invention will be described with reference to FIG. 3. In this embodiment, the present invention is applied to a disk cartridge which holds therein a disk-shaped recording medium D (hereinafter simply referred to as a disk) of shape and size the same as those of, for example, a so-called compact disk (CD). It is to be noted that the disk D held in the disk cartridge of the present invention is not limited to compact disks but may be applied to various other recording media in disk form.

Figure 3:
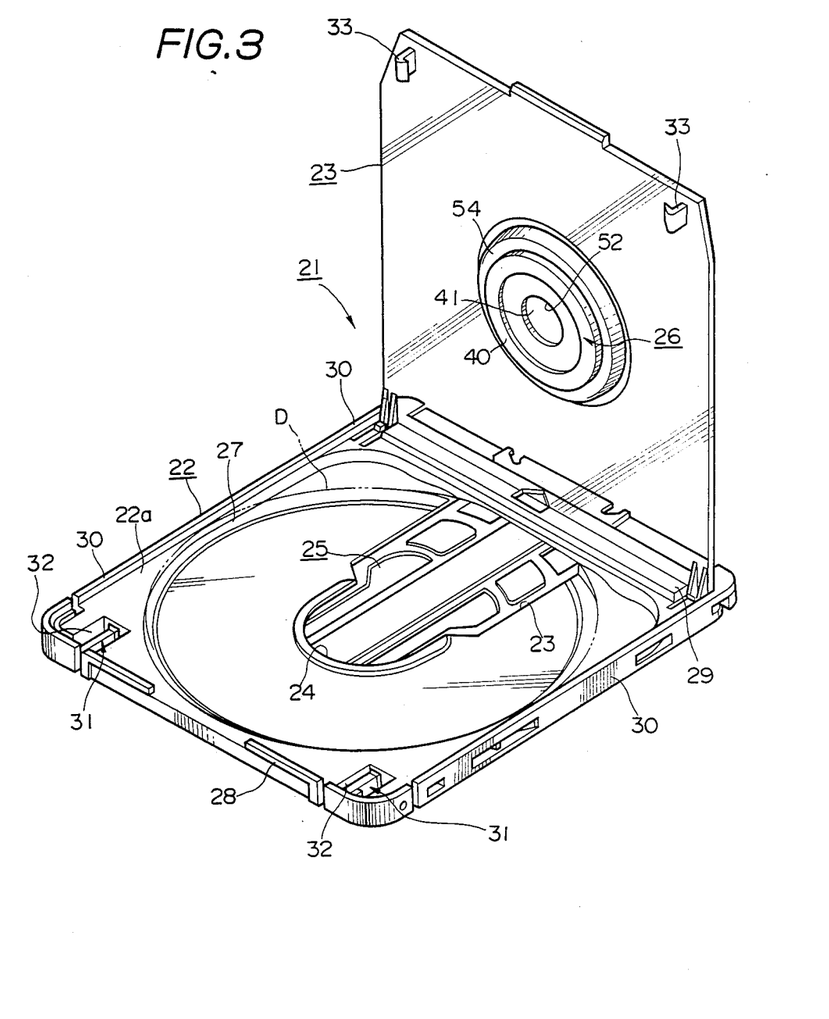
FIG. 3 is a perspective view showing an embodiment of a disk cartridge according to the present invention, with an upper half thereof being opened.
Figure 4:
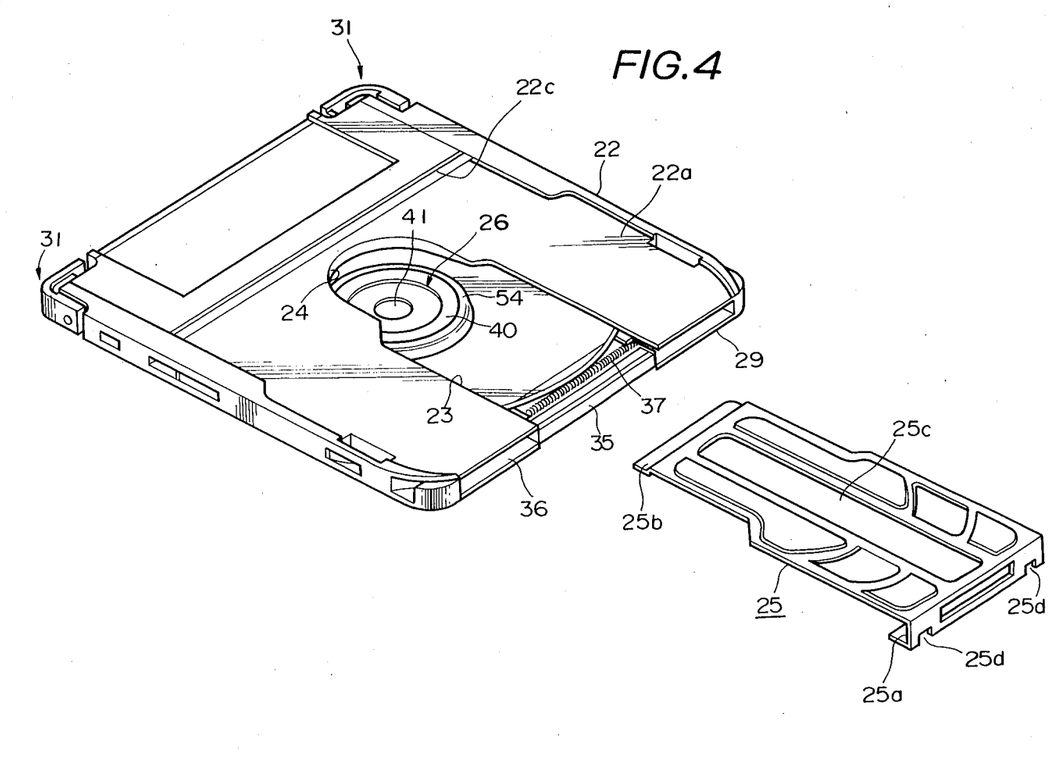
FIG. 4 is a partly exploded perspective view showing the back side of the disk cartridge shown in FIG. 3.

FIGS. 3 and 4 illustrate a first embodiment of a disk cartridge according to the present invention in which FIG. 3 is a perspective view illustrating the front side of the disk cartridge being opened and FIG. 4 is a partly exploded perspective view showing the rear side of the disk cartridge.

As shown in FIGS. 3 and 4, the disk cartridge 21 is made up of a lower half 22 constituting a housing main body and an upper half 23 used as a lid openably and closably mounted to the lower half 22. A shutter 25 is slidably mounted on the lower half 22 and adapted for opening and closing an opening 23 formed in the lower half 22 to expose the signal recording surface of the disk D to the outside the disk cartridge 21 where it is contacted by a recording and/or reproducing pickup device, not shown. The shutter also opens and closes an opening 24, which connected with the opening 23, in which a disk table of a disk drive device, not shown, for rotationally driving the disk D, can be inserted. A clamp unit 26 is rotatably mounted at a position on the inner lateral side of the upper half 23 facing the opening 24.

On the lower half 22, which is a solid rectangular plate formed of synthetic material, there is a formed a circular concaved disk holder portion 27 for holding therein the disk D at the enter of a major surface 22a. At the center of the disk holder portion 27, there is formed the aforementioned opening 24 into which the disk table is inserted, while a second opening for the pickup device 23 is formed in the disk holder portion 27 for extending towards the rear in a continuation of the opening 24.

A front wall section 28 is formed on the front end edge of the major surface 22a, while a rear wall section 29 and side wall sections 30, 30 are formed on the rear end edge and on the right and left side edges of the major surface 22a, respectively. Locking catches 31, 31 for locking the upper half 23 are formed on both front carrier portions of the major surface 22a. Mating locking hooks 33 are provided at the right-hand corners of the upper half 22. A cut-away concaved portion 32 is formed near the right-hand corner portion of the front end of the major surface 22a so as to extend forwards.

To the rear wall section 29, there is pivotally mounted the rectangular upper half 23 corresponding in shape to the major surface 22a of the lower half 22. The upper half 23 is formed of molded synthetic material and is selected in size so that it engages with the inner surface sides of the peripheral wall sections 28, 29, 30, 30 of the major surface 22a of the lower half 2 when the cartridge is closed. The engagement hook portions 33, 33 engage with the locking means 31, 31 when the upper half 23 is closed against the lower half 22.

The upper half 23 when connected to the lower half 22 with the hook portions 33, 33 locked with the locking means 31, 31, may be opened by causing the locking means 31, 31 to be flexed in a direction approaching towards each other to release the hook portions 33, 33. With the upper half 23 thus opened, the disk D contained in the disk holder portion 27 can be exchanged as desired.

As shown in FIG. 4, the shutter 25 is formed of a thin plate such as a metal plate or the like to close the opening 23 for the pickup device and the opening 24 for the disk table in the lower half 22. The shutter slides laterally over the rear portion of the major surface 22a of the lower half 22. A rear portion 25a of the shutter 25 is formed to have a U-shaped cross-section and movably engage with a sliding member or slider 35 which can be slid along a guide groove 36 formed at the rear surface of the rear wall portion 29 in the lateral direction of the major surface 22a. A front portion 25b of the shutter 25 is inserted into a slit 22c formed through the front portion of the rear side of the major surface 22a in the lateral direction and is slidably moved in the lateral direction for opening and closing the openings 23 and 24. The slider 35 is biased by a spring 37 so as to be placed at all times at the central position, so that the shutter 25 normally always closes the openings 23 and 24. Further, on the rear surface side of the shutter 25, there is formed a concave guide groove 25c which is extended in the longitudinal direction of the shutter 25 at its center and in the lateral direction thereof in a rib-like manner.

Figure 5:
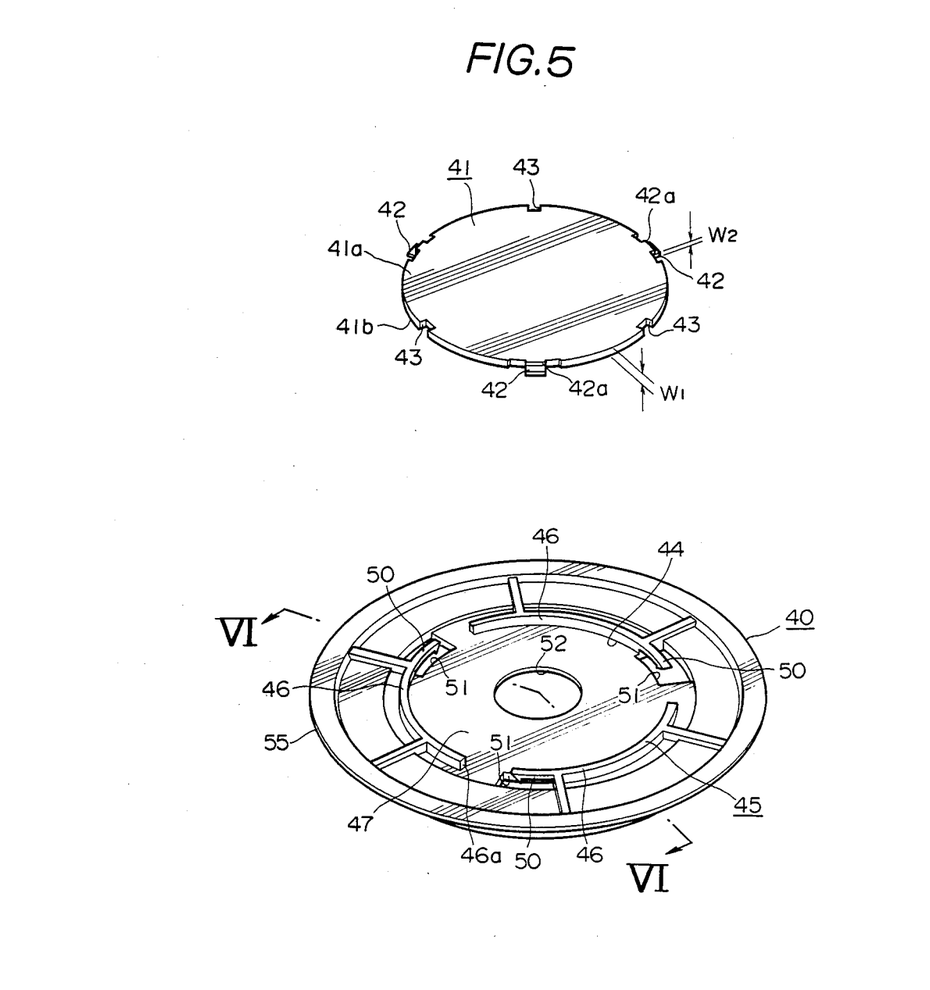
FIG. 5 is an exploded perspective view showing the clamper and the magnetic plate.

As shown in FIG. 5, the clamp unit 26 attached to the upper half 23 is constituted by a clamper 40 formed of synthetic material substantially in a disk shape and a magnetic plate 41 similarly in the disk shape but in smaller in diameter which is attached to one major surface of the clamper 40.

The magnetic plate 41 is formed, for example by punching, a magnetic metal material or a magnetic material other than metal into the form of a thin disk. When formed of iron, the magnetic plate 41 has a thickness $W_1$ of about 0.9 to 1.5 mm. On the outer periphery of the magnetic plate 41, a plurality of, herein three, retaining projections 42 are formed at equiangular intervals. These projections 42 are formed by rolling small projecting pieces formed on punching the magnetic plate 41 from the blank. These projections 42 are formed so as to be lesser in thickness than the magnetic plate 41 and to have a thickness $W_2$ less than half the thickness $W_1$ of the magnetic plate 41. The projections 42 are about 0.3 to 0.7 mm in thickness and are formed to have a step 42a with respect to the upper major surface 41a while being flush with the bottom surface 41b of the magnetic plate 41, as viewed in FIG. 5. On the outer periphery of the magnetic plate 41 are a plurality of, herein three, engaging grooves 43 at equiangular intervals so as to be engaged by a tool adapted for gripping the plate 41 for manual operation thereof for securing it to the clamper 40. These engaging grooves 43 are formed by partially removing the outer peripheral edge of the magnetic plate 41.

Figure 6:
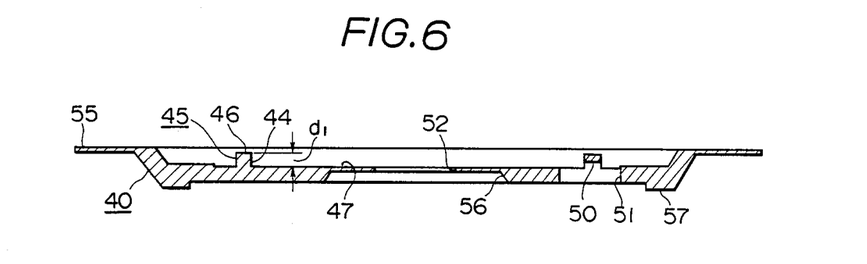
FIG. 6 is a vertical sectional view taken along line VI—VI of FIG. 5.
Figure 7:
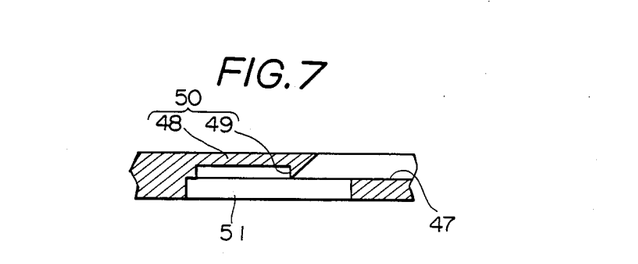
FIG. 7 is a an enlarged vertical sectional view, with portions broken away, showing a hook piece provided to the clamper.

At the center on one major surface of the clamper 40, there is formed a recess 44 for accommodating the magnetic plate 41, as shown in FIG. 1. The recess 44 is formed to have a depth $d_1$ (FIG. 6) which is the same as or slightly larger than the thickness $W_1$ of the magnetic plate 41. Thus the recess 44 has a depth such that the magnetic plate 41 is fully contained in the recess 44 and does not protrude above the top of the recess as viewed in FIG. 6. The peripheral wall of the recess 44 is formed as a ring corresponding to the disk shape of the magnetic plate 41. The peripheral wall 45 of the recesss 44 is formed by a plurality of, herein three, peripheral wall sections 46 arranged in a ring-like shape with a predetermined interval between the adjoining wall sections 46. Each peripheral wall section 46 includes hook means 50 formed of legs 48 formed in the tangential direction of the peripheral wall 45 in parallel with the bottom wall section 47 and hooks 49 projectingly mounted to the end of the legs 48, wherein the legs are spaced from the bottom wall section 47 of the clamper 40 by a predetermined gap sufficient for the projections 42 of the magnetic plate 41 to be engaged therein, as shown in FIGS. 5 and 7. These hooks 49 are each provided to the side of the leg 48 facing to bottom wall section 47 of the clamper 40. At the position of the bottom wall section 47 of the clamper 40 facing to hook means 50, a cut-out or through-hole 51 is provided to increase the amount of projection of the hook 49 while permitting the hook means 50 to be engaged and deflected resiliently. At the center of the bottom wall section 47 disposed within the recess 44, a through-hole 52 is formed for exposing the magnetic plate 41 provided in the recess 44 to the other major surface of the clamper 40.

Figure 9:
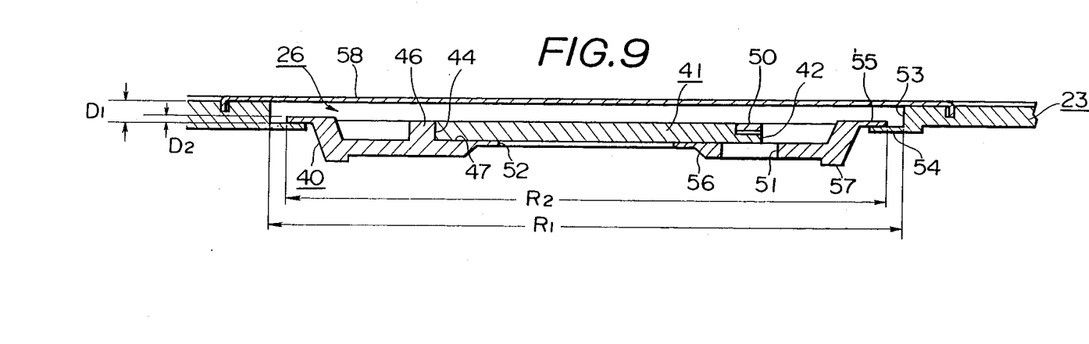
FIG. 9 is a sectional view showing the clamper when attached to the upper half of the disk cartridge.

As best shown in FIG. 9, a ring-like flange 55 projects from the outer periphery on the main surface of the clamper 40. The clamper 40 is held seated within a clamper attachment opening 53 (FIG. 9) bored in the upper half 23 by retaining piece 54 which protrudes from to the inner periphery of the attachment opening 53 to prevent accidental extrication of the clamper 40 from the opening 53. A tapered, concave centering surface 56 is formed on the other major surface of the clamper 40 for centering the clamper 40 and the magnet holding member provided to the disk table, when the disk D is clamped to the disk table as will be later described. A disk engaging and supporting section 57 for engaging and supporting the disk D onto the disk supporting surface of the disk table table is formed on the bottom surface of the clamper 40, as viewed in FIG. 9, concentric of the section 57.

The magnetic plate 41 is secured integrally to the clamper 40 as will be later described.

Figure 8:
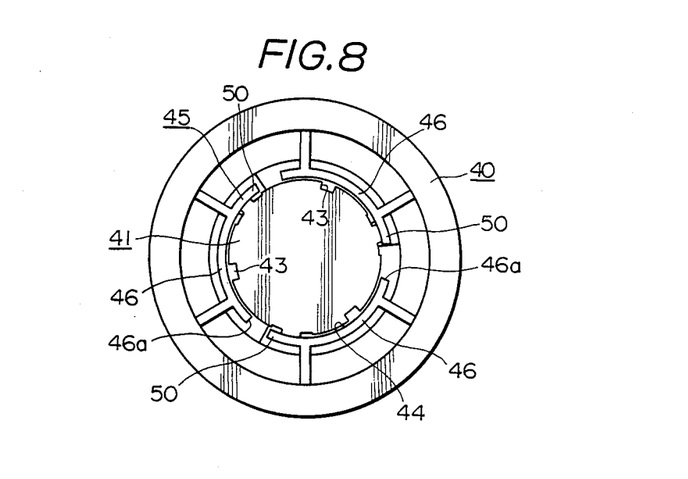
FIG. 8 is a plan view showing the clamper and the magnetic plate when assembled together.

Thus the magnetic plate 41 can be seated within the recess 44 with the one major surface 41b thereof formed with the projections 42 resting on the bottom wall section 47 of the clamper 40. When so seated, each of the projections 42 aligns with a gap 46a between the adjoining peripheral wall sections 46. The magnetic plate 41 is thereafter secured to the clamper 40, as shown in FIGS. 8 and 9, by engaging a tool, not shown, in the engaging grooves 43 in the magnetic plate 41 and turning the plate 41 with the aid of the tool for engaging the projections 42 with the hooks 49 of the hook means 50. Since the hooks 49 of the hook means 50 project towards the bottom wall section 47 of the clamper 40, the magnetic plate 41, once secured to the clamper 40, will not disengage from the clamper during operation.

As described hereinabove, the clamper 40 with the magnetic plate 41 secured thereto is rotatably mounted to the inner lateral side of the upper half 23 of the disk cartridge 21, as shown in FIGS. 3 and 9. That is, the clamper 40 is rotatably disposed within the clamper attachment through-hole 53 formed in the upper half 23 at a position wherein one major surface faces the opening 24 for the disk table formed in the lower half 22. The retaining flange 54 is formed on the inner periphery of the clamper attachment through-hole 53. The clamper 40 has its other major surface thereof formed with the disk engaging and supporting section 57 directed to the inside of the cartridge 21 and with the flange 55 captured by the retaining piece 54 a cover plate 58 closes the clamper attachment though-holes 53 and is attached to the outer lateral surface of the upper half 23, whereby the clamper 40 is attached to the upper half 23 and cannot be extricated through the attachment through-hole 53 but is freely rotatable within the gap between the cover plate 58 and the retaining piece 54. The diameter $R_1$ of the clamper attachment through-hole 53 is selected to be slightly larger than the outside diameter $R_2$ of the clamper 40, while the depth $D_1$ of the through-hole 53 is selected to be larger than the thickness $D_2$ of the flange section 55 of the clamper 40. When the clamper 40 is coupled to the disk table, the connecting portion thereof with respect to the disk table can be adjusted with corrections for movement being made in both the radial and axial directions.

The disk cartridge 21 so far shown and described is mounted in the recording and/or reproducing apparatus, not shown, in the manner as hereafter described, whereby the shutter 25 is manipulated so as to be opened to clamp the disk D on the disk table of the disk drive device to enable disk rotation in unison with the rotation of the disk table.

Figure 10:
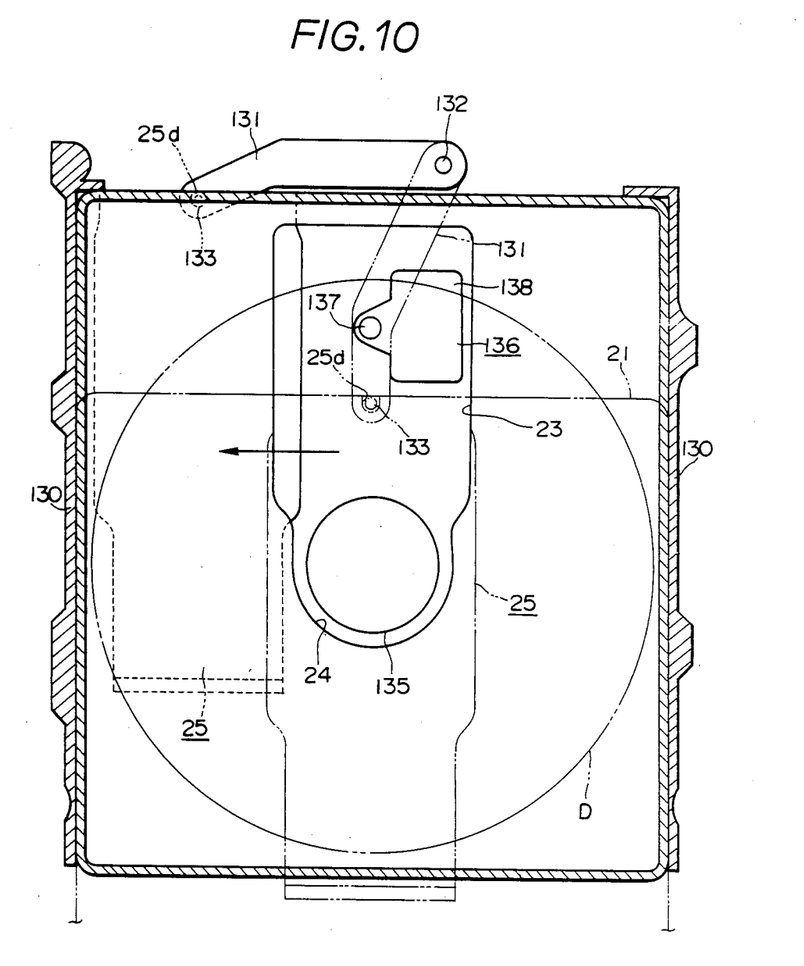
FIG. 10 is a horizontal sectional view, with portions in elevation, showing the main portion of a mechanism provided in a recording and/or reproducing apparatus according to the present invention and especially showing the shutter when moved towards left.

Thus, referring to FIG. 10 the recording and/or reproducing apparatus, not shown, into which the disc cartridge 21 is loaded, is provided with a pair of right and left insertion guide members 130 and 130. A lever 131 for opening the sutter 25 is provided in the recording and reproducing apparatus and is located so as to oppose the space between these guide members 130 and 130. The lever 131 is rotatably supported on the recording/reproducing apparatus by a supporting pin 132 and is ordinarily placed at the postion shown by a double-dot chain line in FIG. 10. The lever 131 has a free end thereof which is provided with a pin 133 for engagement with notch 25d of the shutter 25 so as to open the shutter 25. In this case, two notches 25d and 25d, see FIG. 4, may be provided on the shutter 25 spaced apart by a distance in the direction along which the shutter 25 is slidably moved.

With the construction made hereinabove, when a pickup device 136 off the recording/reproducing apparatus, which is provided with an objective lens drive mechanism 138 placed at the right-hand side relative to an objective lens 137, is employed as shown in FIG. 10, the shutter 25 is moved towards the left as shown by the broken line in FIG. 10. In this case, the supporting pin 132 of the lever 131 is displaced towards the right, relative to the center, as viewed in FIG. 10.

If the disk cartridge 21 is inserted between the insertion guide members 130 and 130 of such a recording/reproducing apparatus, when the front end of the disk cartridge 11 is partially inserted into the recording/reproducing apparatus to assume the position shown by a double-dot chain line in FIG. 10, the notch 25d of the shutter 25 is engaged with the pin 133 implanted at the free end of the lever 131. When the disc cartridge 21 is further inserted upwards in the figure along the guide members 130 and 130, the lever 131 is rotated about the supporting pin 132 in the clockwise direction. Accordingly, the shutter 25 is moved towards the left by the pin 133 in association with the rotation of this lever 131, whereby the openings 23 for the pickup device and 24 for the disk table are opened as shown in FIG. 10. In other words, the shutter 25 for completely opens the opening 24 of the disk cartridge 21. As a result, a disk table 135 can be inserted into the disk cartridge 21 through this opening 24 for the disk table. Further, the shutter 25 completely opens the right-hand portion of the opening 23 while covering a part of the left-hand portion of the opening 23. This provides an opening large enough to enable the pickup device 136 provided at its right-hand side with the objective lens drive mechanism 138 to be moved thereinto.

Figure 11:
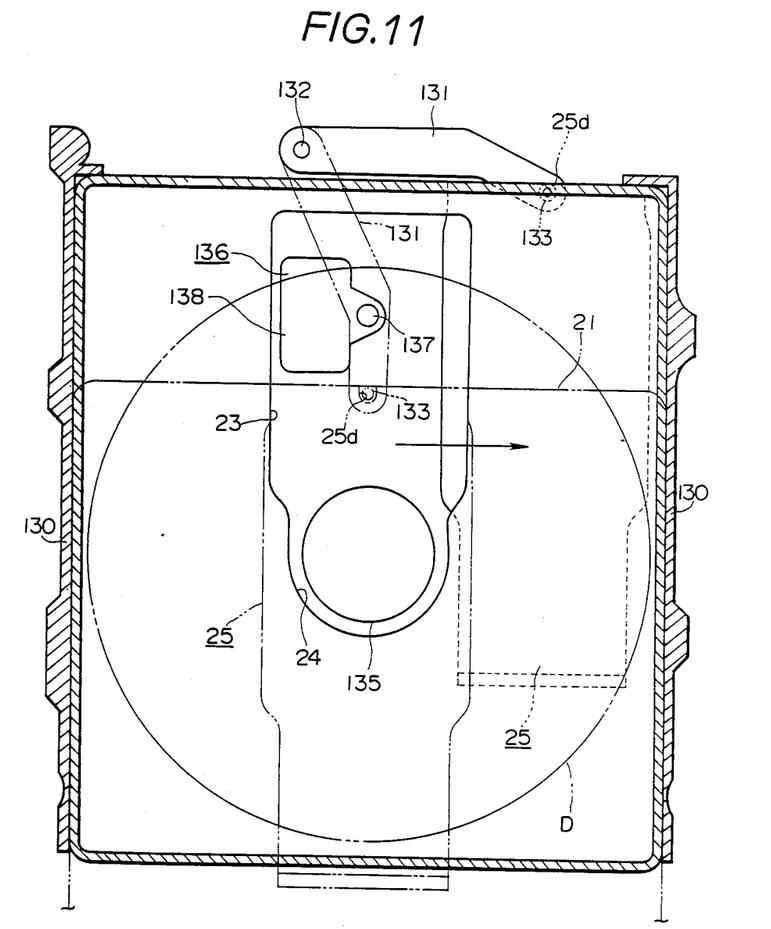
FIG. 11 is a horizontal sectional view similar to FIG. 10 and showing the shutter when moved towards right.

In an alternative arrangement, when a pickup device 136 having at its left-hand side the objective lens driving mechanism 138 relative to the objective lens 137, is utilized, the supporting point pin 132 of the lever 131 is displaced towards the left as shown in FIG. 11. Then, if the disk cartridge 21 is inserted between the guide members 130 and 130, the notch 25d of the shutter 25 and the pin 133 of the lever 131 are engaged with each other at the position shown by a double-dot chain line in FIG. 11. If the disk cartridge 11 is further inserted or further moved upwards in the figure, the shutter 25 is moved rightward as the lever 131 is rotated in the counterclockwise direction about the pin 132. As a result, the shutter 25 completely opens the opening 24, through which the disk table 135 can be inserted, and the left-hand portion of the opening 23 for the pickup device while continuing to close a part of the right-hand portion of the rectangular opening portion 23, thus enabling the pickup device 136 to move in the axial direction of the disk D.

Furthermore, if the disc cartridge 11 is unloaded from the recording and/or reproducing apparatus after the playback thereof is terminated, the shutter 25 is returned to the central position by the force of a spring 37 so as thereby to close the openings 23, 24. According to the mechanism using the spring 37, the shutter 25 is movable both in the right-hand and left-hand directions and can always be always returned to the central position by the use of the single spring 37 and placed at the correct position at which the shutter 25 covers the opening 23, 24.

As described above, when the disk cartridge 21 is introduced into the recording and/or reproducing apparatus and the shutter 25 is displaced to open the opening 24 for the disk table, so that the disk cartridge is attached to the recording and/or reproducing apparatus, the disk table 135 is inserted into the opening 24. The disk D accommodated within the disk cartridge 21 is attached to the disk table 135 and clamped as shown in FIG. 12 to the aforementioned clamp unit 26 so as to be integrally connected to the disk table 135.

Figure 12:
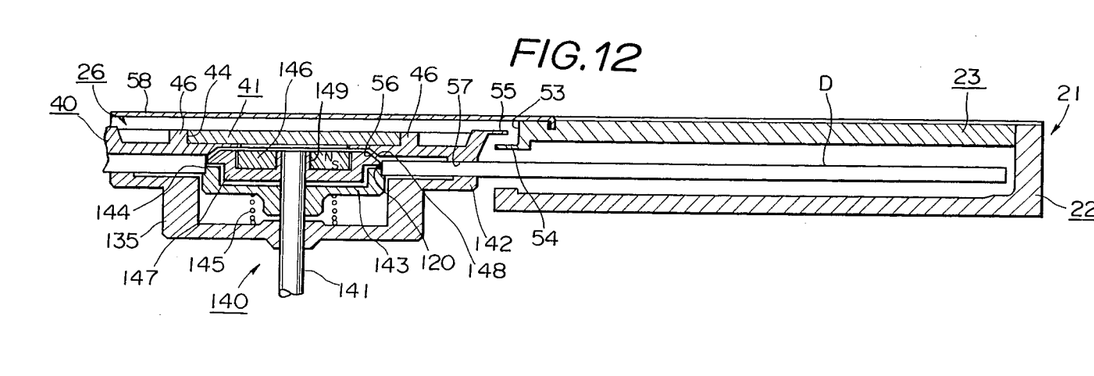
FIG. 12 is a vertical sectional view showing the disk when clamped onto the disk table.

Referring to FIG. 12, the disk drive unit 140 of the recording and/or reproducing apparatus is provided with a disk table 135 which is integrally fitted a center spindle 141 to which a driving force is transmitted from a rotary drive source, not shown, directly or indirectly through a transmission system, also not shown. The disk table 135 is provided on its outer perimeter with a disk supporting section 142 for supporting the perimeter of a center opening 120 of the disk D. On the inner periphery of the disk table 135, there is provided a disk centering member 143 which slides axially along the center spindle 141. The disk centering member 143 is provided at the foremost part thereof with a tapered disk centering surface 144 adapted to be fitted to the center opening 120 of the disk D, and is biased resiliently upward by a coil spring 145. When the disk D is attached to the disk table 135, the disk centering member 143 is pushed by the disk D against the bias of the coil spring 145 so as to be engaged in the center opening 120 to provide for centering of the disk D with respect to the center spindle 141.

On the upper end of the center spindle 141, there is integrally fitted a magnet holding member 147 for holding a permanent magnet 146 to magnetically attract the magnetic plate 41 secured to the clamper 40. The magnet holding member 147 is attached to the end of the center spindle 141 to capture the disk of the disk centering member 143 on the center spindle 141. It is noted that the magnet holding member 147 is smaller in diameter than the center opening 120 of the disk D and is formed at its upper surface thereof with a tapered clamper centering surface 148 for engaging with the centering surface 56 of the clamper 40 to provide for centering of the clamper 40 with respect to the magnet holding member 147. The magnet 146 held by the magnet holding member 147 is in the form of a ring and magnetized along the thickness as shown in FIG. 12. The magnet 146 is disposed so as to be embedded within a mating recess 149 formed in the upper surface of the magnet holding member 147.

With the above construction of the disk table 135, the disk D is placed on and attached to the disk supporting section 142 with correct centering with respect to the center spindle 141 by having the disk centering member 143 fitted into the center opening 121 of the disk D. When the disk D is mounted to the disk table 135 in this manner, the magnetic plate 141 secured to the clamper 40 is magnetically attracted by the magnet 146 and the centering surface 56 is engaged with the clamper centering surface 148 of the magnet holding member 147 so that the clamper 40 is attracted onto the disk table 135 with correct centering to the magnet holding member 147. The clamper 40 can be rotated in unison with the disk table 135 with the disk supporting member 57 pushing against the perimeter of the center opening 120 of the disk D to force the disk against the disk table 135 and to clamp the disk D in cooperation with the disk table 135.

When the disk D is clamped in the above manner, the clamper 40 floats within the clamper attachment throughhole 53 so a state of free revolution is provided without the flange section 55 contacting the locking piece 54.

The magnetic plate 41 in the above described disk cartridge 21 can be secured by simply engaging the projections 42 with the clamper 40 so that the attachment operation can be facilitated without the need of resorting to ultrasonic welding. Also, since each projection 42 has a thickness less than that of the magnetic plate 41, it suffices that the recess 44 for accommodating the magnetic plate 41 only has a depth sufficient to accommodate the magnetic plate 41. The hooks 50 engaging the projections 42 can be formed in a portion of the peripheral wall 45 of the recess 44 so that a reduction in thickness of the disk cartridge 21 is achieved.

The above description is given for the preferred embodiments of the invention but it will be apparent that many modifications and variations could be effected by one skilled in the art without departing from the spirit or scope of the novel concepts of the invention so that the scope of the invention should be determined by the appended claims only.

What is claimed is:

1. A disk cartridge comprising a pair of cartridge housing halves which are attached to each other to make up a hollow housing for containing a disk shaped recording medium, a clamper of synthetic material rotatably mounted to one of the disk cartridge halves and a magnetic plate secured to said clamper, the magnetic plate having a plurality of projections, said clamper being integrally formed to have a bottom wall with a recess therein having a peripheral wall, the recess being dimensioned for accommodating said magnetic plate, and a plurality of hook means formed along the peripheral wall of the recess, said projections in said magnetic plate being respectively engageable with said hook means to secure said magnetic plate to said clamper.

2. The disk cartridge according to claim 1 wherein said magnetic plate is a disk, said peripheral wall of said recess being contoured to conform to said disk and being composed of a plurality of peripheral wall sections separated by a predetermined distance from each other and extending perpendicular to the bottom wall, said hook means being integral with said peripheral wall sections and each including a hook and a leg separated by a predetermined distance from the bottom wall section of the clamper, said leg being parallel to the bottom wall and extending tangentially to one of said peripheral walls.

3. The disk cartridge according to claim 2 wherein each of said magnetic plate projections has a thickness less than that of said magnetic plate.

4. The disk cartridge according to claim 3 wherein each of said magnetic plate projections has a thickness not more than half that of said magnetic plate.

5. The disk cartridge according to claim 2 wherein said magnetic plate includes a groove into which a tool for attachment operation is engageable.

6. The disk cartridge according to claim 5 wherein an opening is provided in the bottom wall of the clamper at a position facing said hook means.

7. The disk cartridge according to claim 2 wherein said magnetic plate's thickness is not greater than the depth of the recess whereby the magnetic plate can be seated flush within the recess.

8. The disk cartridge according to claim 1 wherein said projections are equiangular spaced from one another and said hook means are equiangular spaced from one another.

* * * * *